United States Patent
Gonzales et al.

(10) Patent No.: US 11,557,019 B1
(45) Date of Patent: Jan. 17, 2023

(54) HOMOGRAPHY GENERATION FOR IMAGE REGISTRATION IN INLIER-POOR DOMAINS

(71) Applicant: National Technology & Engineering Solutions of Sandia, LLC, Albuquerque, NM (US)

(72) Inventors: Antonio Gonzales, Albuquerque, NM (US); Tony Perkins, Albuquerque, NM (US); Cara Patricia Monical, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 103 days.

(21) Appl. No.: 17/118,805

(22) Filed: Dec. 11, 2020

(51) Int. Cl.
  *G06T 3/00* (2006.01)
  *G06V 10/46* (2022.01)
(52) U.S. Cl.
  CPC .......... *G06T 3/0068* (2013.01); *G06V 10/462* (2022.01)
(58) Field of Classification Search
  CPC ......... G06T 3/0068; G06T 2207/10021; G06T 7/33; G06T 7/38; G06V 10/462
  See application file for complete search history.

(56) References Cited

U.S. PATENT DOCUMENTS

| 2015/0310135 A1* | 10/2015 | Forsyth | G06F 30/13 |
| | | | 703/1 |
| 2017/0178372 A1* | 6/2017 | Gormish | G06K 9/6215 |
| 2017/0180644 A1* | 6/2017 | Alibay | H04N 5/145 |
| 2022/0051431 A1* | 2/2022 | Jagadeesan | G06T 7/73 |

OTHER PUBLICATIONS

Barath, et al., "Homography from two orientation- and scale covariant features", In Proceedings of the IEEE International Conference on Computer Vision, 2019, pp. 1091-1099.
Scaramuzza, D., "1-Point-RANSAC Structure from Motion for Vehicle-Mounted Cameras by Exploiting Non-holonomic Constraints" In International Journal of Computer Vision, vol. 95, No. 1, 2011, pp. 74-85.

* cited by examiner

*Primary Examiner* — Margaret G Mastrodonato
(74) *Attorney, Agent, or Firm* — Samantha Updegraff; Calfee, Halter & Griswold LLP

(57) ABSTRACT

A method for efficient image registration between two images in the presence of inlier-poor domains includes receiving a set of candidate correspondences between the two images. An approximate homography between the two images is generated based upon a first correspondence in the correspondences. The set of candidate correspondences is filtered to identify inlier correspondences based upon the approximate homography. A candidate homography is computed based upon the inlier correspondences. The candidate homography can be selected as a final homography between the two images based upon a support of the candidate homography against the set of candidate correspondences. An image registration is performed between the two images based upon the candidate homography being selected as the final homography.

20 Claims, 6 Drawing Sheets

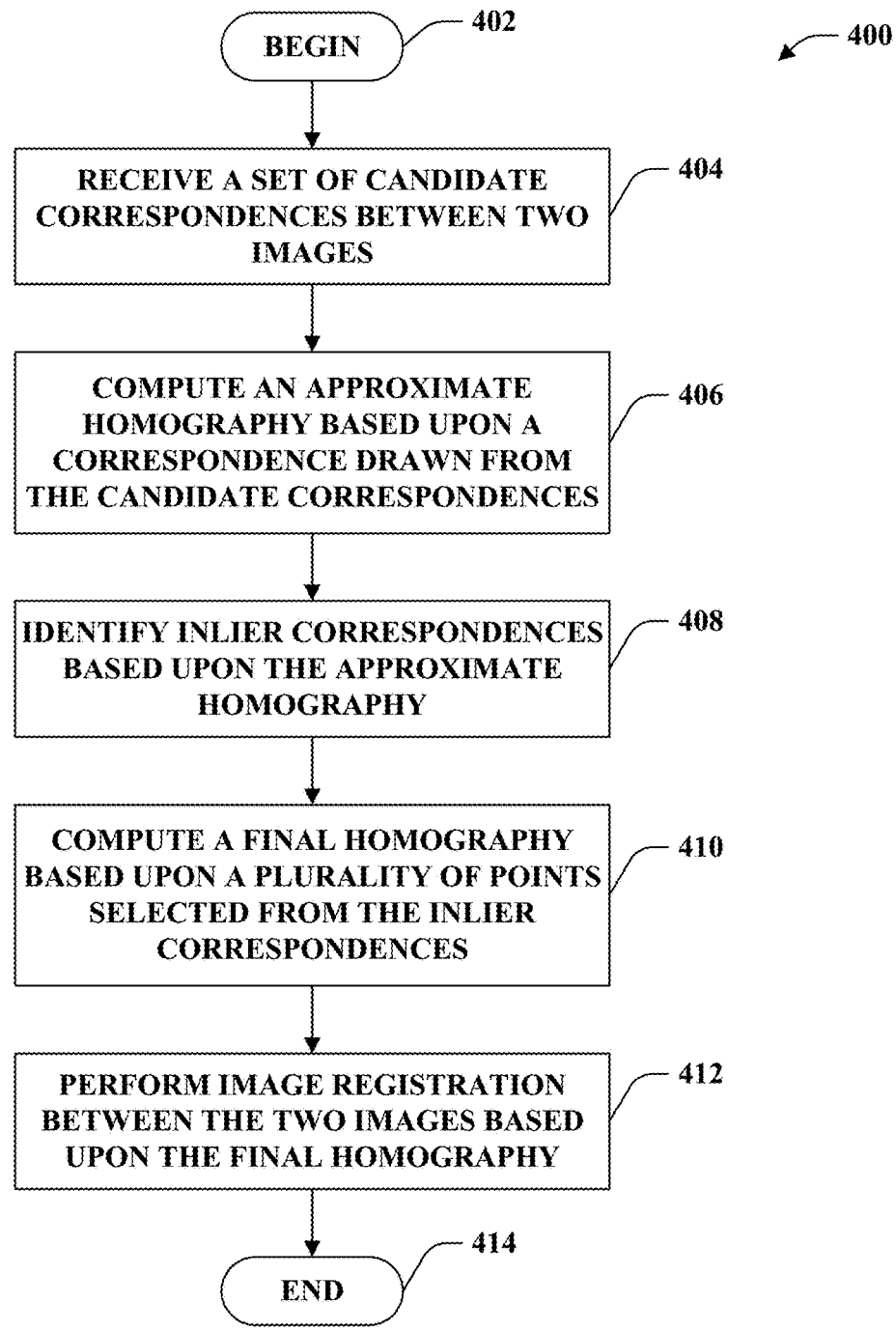

HOMOGRAPHY GENERATION FOR IMAGE REGISTRATION IN INLIER-POOR DOMAINS

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Image registration is employed in various computer vision applications in order to relate images taken from different positions or at different times to one another. Image feature detectors have been developed that are configured to identify candidate correspondences that are indicative of a single point from each of two images that are likely to be representative of a same portion of a same object or image feature. A homography between two images defines a relationship between the two images by which points in a first image can be projected to corresponding points in a second image. A homography between two images can be estimated based upon candidate correspondences generated by image feature detectors.

In a conventional approach to homography estimation, a candidate homography is computed based on four correspondences randomly selected from a larger group of candidate correspondences. In general, it is not known a priori which of a set of candidate correspondences generated by a feature detector are inliers (i.e., true correspondences that indicate points in two images that are representative of a same real location depicted in the two images), and which are outliers (i.e., correspondences that indicate points in two images that are not representative of a same real location depicted in the two images). Therefore, conventionally a homography is estimated iteratively by repetitively computing candidate homographies and computing the support of each candidate homography, which can be taken as the number of candidate correspondences in the larger set of candidate correspondences that the candidate homography projects to their expected location, within a small threshold $\varepsilon$. The candidate homography with the largest support among the iteratively computed candidate homographies can be returned as an estimate of the homography. A number of iterations run can be varied based upon a desired probability of computing a homography based upon a random sample consisting entirely of inliers.

While this conventional approach can be efficiently executed when the inlier rate of the set of candidate correspondences is high (e.g., greater than 15%), when the inlier rate is low (e.g., less than or equal to 15%), the conventional approach becomes prohibitively computationally expensive. For example, and referring briefly to FIG. 6, a graph 600 is shown that depicts a number of iterations of a random sample consensus (RANSAC) algorithm required to achieve a 95% probability of drawing all inlier samples at least once, plotted against the inlier rate of the correspondence set from which samples are drawn. The graph 600 depicts a different plot for each of n=1, 2, 3, or 4, where n is a number of random samples from the correspondence set that are used to compute a candidate homography. As can be seen from the graph 600, for a conventional four-sample RANSAC algorithm, the number of required RANSAC iterations to assure a 95% probability of drawing all inliers at least once becomes very large when the inlier rate drops below about 15%. Even if a homography estimation algorithm required only two samples, the number of iterations required to assure 95% probability of sampling only inliers would become very large below an inlier rate of about 5%.

For some imaging applications, due to noise or other factors the inlier rate of correspondences may be very low (e.g., less than or equal to 10%, less than or equal to 5%, less than or equal to 2.5%). In such cases, an accurate homography often cannot be practically calculated with existing techniques within a useful amount of time given limitations of available computing resources.

SUMMARY

The following is a brief summary of subject matter that is described in greater detail herein. This summary is not intended to be limiting as to the scope of the claims.

Technologies pertaining to improved image registration and improved computation of a homography between two images having an inlier-poor correspondence set are described herein. In an exemplary embodiment, a set of candidate correspondences between two images is generated by execution of a feature matching algorithm over the two images, wherein each candidate correspondence is indicative of a pair of points, one drawn from each of the two images. An approximate homography can be generated based upon a single correspondence selected from the candidate correspondences, and based further upon scale and orientation parameters associated with the points of the selected correspondence. The approximate homography is unlikely to be sufficiently accurate to perform image registration between the two images. However, an average reprojection error associated with inlier correspondences tends to be lower than for outliers. Thus, the approximate homography can be used to identify likely inlier correspondences by computing the reprojection error of each of the candidate correspondences relative to the approximate homography. Correspondences with a lower-than-threshold level of reprojection error can be labeled as being likely to be inlier correspondences.

The labeled inlier correspondences can then be used as input candidate correspondences to a homography estimation algorithm that is configured to iteratively estimate a homography between the two images based upon candidate correspondences. By way of example, and not limitation, the homography estimation algorithm can be an algorithm selected from a family of RANSAC algorithms. The homography estimation algorithm can be configured to draw samples from the inlier correspondences in order to compute each candidate homography. The homography estimation algorithm can further be configured to evaluate support of each candidate homography against the whole set of candidate correspondences generated by the feature matching algorithm. A candidate homography can be selected as a final homography between the two images based upon the candidate homography having a greatest support among the computed candidate homographies. The two images can then be registered to one another based upon the final homography. Stated differently, the two images can be aligned to a common coordinate system based upon the final homography.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 is a flow diagram that illustrates an exemplary methodology for computing a homography and registering images from an inlier-poor correspondence set.

DETAILED DESCRIPTION

Figure 1:
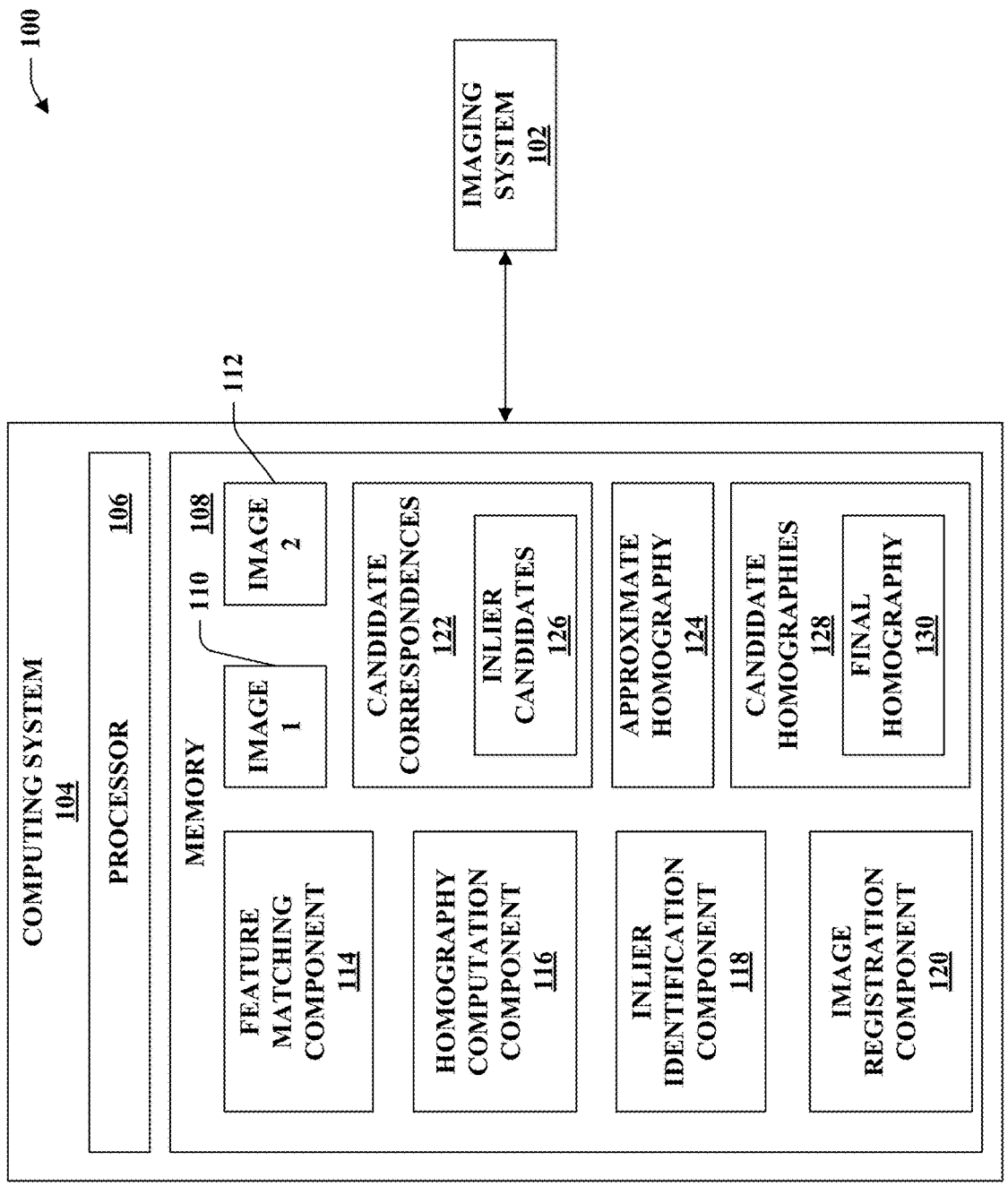
FIG. 1 is a functional block diagram of an exemplary system that facilitates image registration and homography computation over inlier-poor correspondence sets.

Various technologies pertaining to image registration and image homography estimation are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates homography estimation and image registration between images is illustrated. The system 100 includes an imaging system 102 and a computing system 104. The imaging system 102 can be or include one or more cameras that are configured to capture images of a scene. For example, the imaging system 102 can be an aircraft or spacecraft that comprises a camera, wherein the camera is configured to capture images of a region below the craft. The imaging system 102 can be configured to output or transmit the images to the computing system 104. It is to be understood that in other embodiments, the computing system 104 can be included on or in the imaging system 102 as a component of the imaging system 102. For instance, in embodiments wherein the imaging system 102 is embodied by an aircraft, the computing system 104 can be or include a computing device that is mounted on board the aircraft. In such embodiments, it may be unnecessary for the imaging system 102 to transmit the images to the computing system 104.

The computing system 104 is configured to perform image registration between pairs of images generated by the imaging system 102. The computing system 104 comprises a processor 106 and memory 108 that stores instructions that are executed by the processor 106. The memory 108 can further store images that are received by the computing system 104 from the imaging system 102. For example, the computing system 104 can receive a first image 110 and a second image 112 from the imaging system 102 and store the images 110, 112 in memory 108. The images 110, 112 depict at least a portion of a same object or scene.

Figure 2:
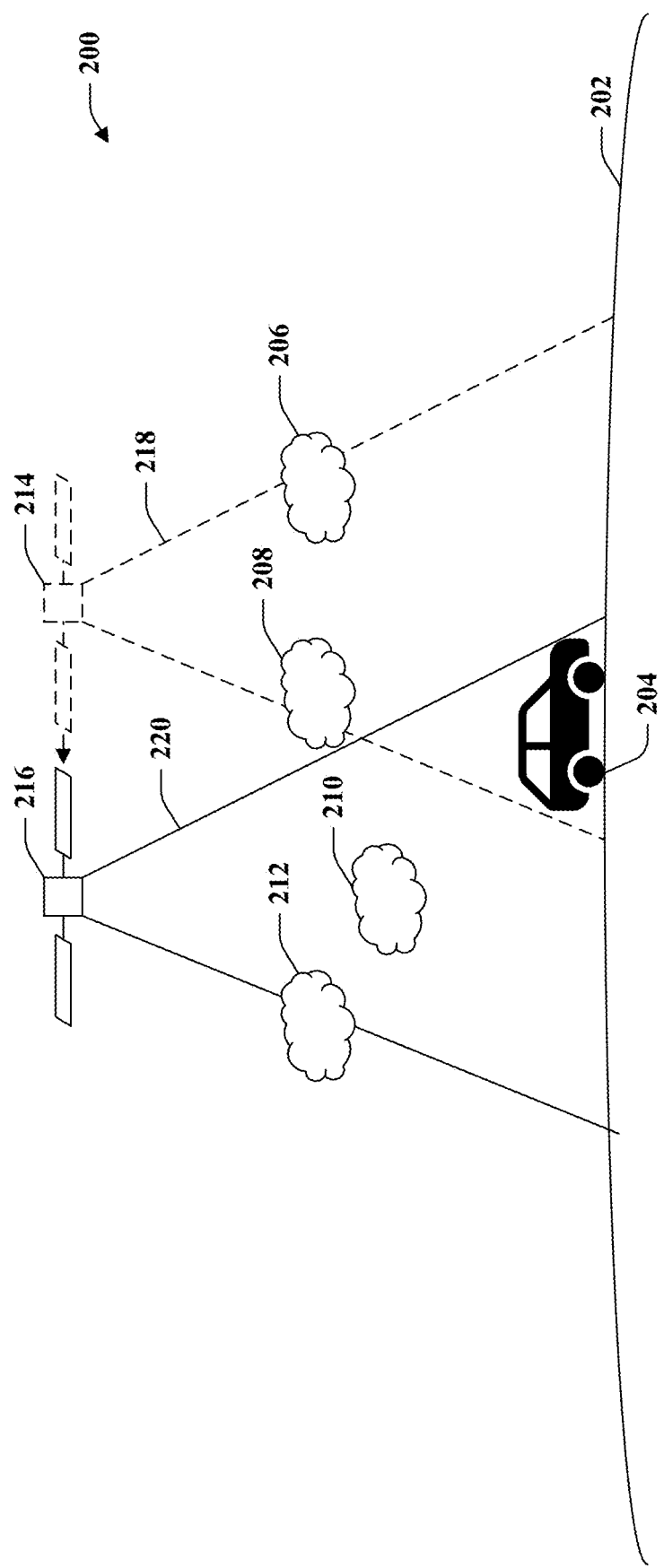
FIG. 2 is a conceptual diagram of an exemplary scene.

For example, and referring now to FIG. 2, a diagram of an exemplary scene 200 is shown. The scene 200 includes a ground surface 202, a car 204, and several clouds 206-212. The diagram 200 further illustrates a first position 214 of a satellite at a first time and a second position 216 of the satellite at a second time subsequent to the first time. The diagram depicts a first field of view (FOV) 218 of the satellite when the satellite is at the first position 214 and a second FOV 220 of the satellite when the satellite is at the second position 216.

Figure 3B:
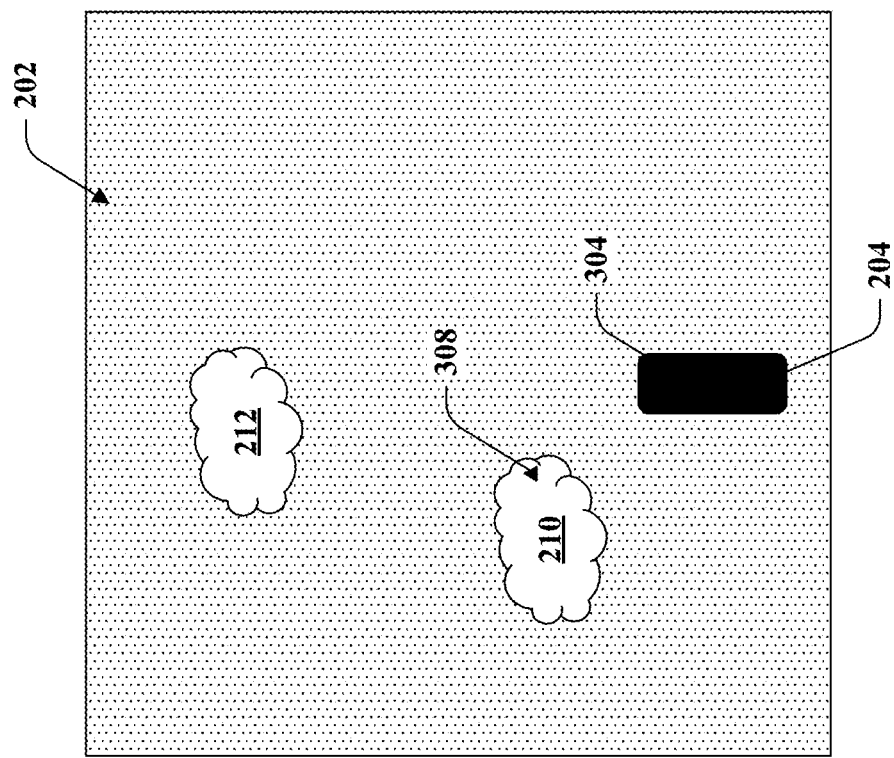
FIGS. 3A and 3B are exemplary images of the scene of FIG. 2.
Figure 3A:
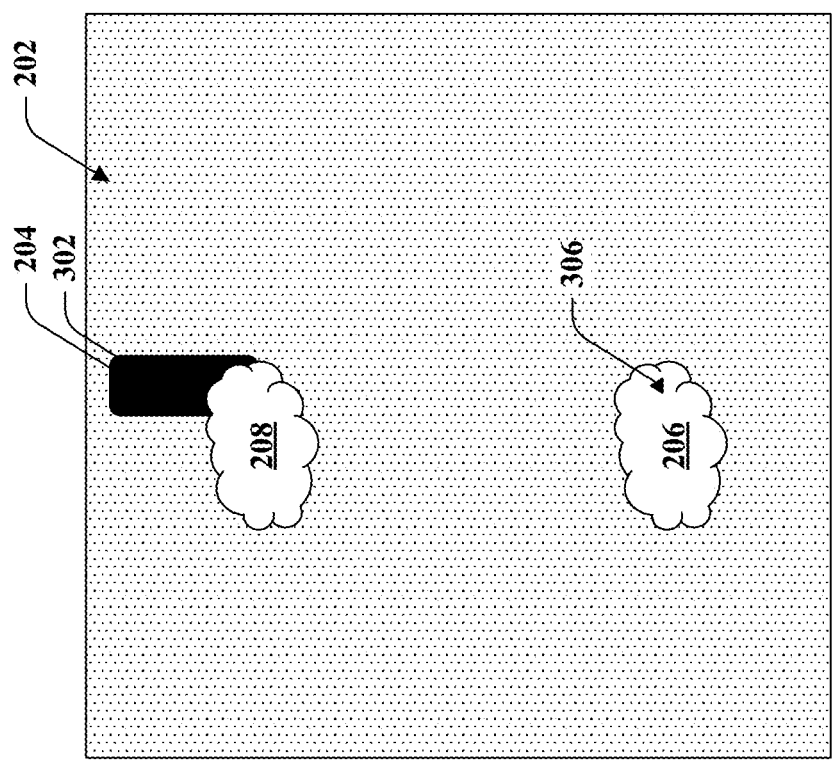

Referring now to FIGS. 3A and 3B, exemplary images 302, 304 are illustrated that correspond to the FOVs 218, 220, respectively. The images 302, 304 each depict the car 204 and portions of the ground surface 202. Referring now solely to FIG. 3A, the first image 302, depicting the FOV 218 of the first position 214 of the satellite, includes clouds 206, 208. Referring now solely to FIG. 3B, the second image 304, depicting the FOV 220 of the second position 216 of the satellite, includes clouds 210, 212 (but not clouds 206, 208, which are outside the second FOV 220). Accordingly, the images 302, 304 include at least some common portions of common real world objects, wherein such objects may be depicted at different positions in the images 302, 304.

Referring once again to FIG. 1, the memory 108 includes a feature matching component 114, a homography computation component 116, an inlier identification component 118, and an image registration component 120. The feature matching component 114 is configured to identify features in the images 110, 112 and to match corresponding features between the images 110, 112 to generate candidate correspondences, which are then stored in the memory 108 as candidate correspondences 122. Each of the candidate correspondences 122 is indicative of a first location in the first image 110 and a second location in the second image 112 that are determined by a feature matching algorithm to be likely to be representative of a same portion of a same object depicted in the images 110, 112.

The feature matching component 114 can generate the candidate correspondences 122 by executing any of various feature matching algorithms over the images 110, 112. By way of example, and not limitation, the feature matching component 114 can execute a feature matching algorithm that belongs to a family of scale-invariant feature transform (SIFT) algorithms. In another example, the feature matching component 114 can execute a feature matching algorithm that belongs to a family of speeded-up robust features (SURF) algorithms. While various exemplary feature matching algorithms are referenced herein, other feature matching algorithms are contemplated as being within the scope of the present disclosure.

The homography computation component 116 is configured to generate candidate homographies that each define a transformation from positions in the first image 110 to positions in the second image 112. In general, a homography H between two images can be represented as a 3×3 matrix that transforms a point $P_1=[u_1, v_1, 1]$ in the first image 110 to a location $P_2=[u_2, v_2 1]$ in the second image 112 by way of the following transformation:

$$\begin{bmatrix} h_1 & h_2 & h_3 \\ h_4 & h_5 & h_6 \\ h_7 & h_8 & h_9 \end{bmatrix} \begin{bmatrix} u_1 \\ v_1 \\ 1 \end{bmatrix} = \begin{bmatrix} u_2 \\ v_2 \\ 1 \end{bmatrix} \quad \text{Eq. 1}$$

where u and v are coordinates in a planar projection coordinate system of an image. A system of homogeneous linear equations to solve for the elements of matrix H can be generated by substituting points defined by correspondences in the candidate correspondences 122 into Eq. 1. Each correspondence, which defines a pair of points $P_1$, $P_2$, yields 2 homogeneous linear equations. Four different correspondences can be employed to generate 8 such homogeneous linear equations, with a $9^{th}$ equation $h_9=1$ to ensure a unique and non-zero solution. This system of equations can be solved using a least-squares solution method.

While a homography between the images 110, 112 can be computed based upon the system of equations described above, the homography will not be accurate if the four candidate correspondences used to compute the homography are not inliers. As used herein, a candidate correspondence is said to be an inlier if the points of the correspondence are representative of a same portion of a same real world object depicted in both of the images 110, 112. Similarly, a candidate correspondence is an outlier if the points of the correspondence are not representative of a same portion of a same real world object depicted in the images 110, 112. In many applications, however, whether a candidate correspondence is an inlier or an outlier is not known a priori. For example, and referring once again to FIGS. 3A and 3B, points 302 and 304 can be identified by a feature matching algorithm as comprising a first correspondence, and points 306 and 308 can be identified by the feature matching algorithm as comprising a second correspondence. The first correspondence is an inlier, because the points 302, 304 are both representative of a same portion of the car 204. The second correspondence is an outlier because the points 306, 308 are representative of different objects, namely, the clouds 206, 210, respectively. In practical applications, it may not be known whether the pairs of points 302, 304 and 306, 308 are representative of same or different objects. In some cases, it may not even be known whether the points 302, 304, 306, 308 are representative of signal or noise.

Previous approaches to estimating the homography matrix H have employed a robust estimator algorithm, such as RANSAC, that iteratively solves for H by randomly selecting correspondences from a set of candidate correspondences that are used to compute H, and evaluating the support of the resultant matrix over the whole set of candidate correspondences. However, this approach is intractable when the inlier rate of the set of candidate correspondences is low. It can be shown that for an inlier rate w and using n sample correspondences to compute each homography, an iterative computation of candidate homographies will have a probability p of computing at least one candidate homography based solely on inlier correspondences if k iterations are performed, where k is defined by:

$$k = \frac{\log(1-p)}{\log(1-w^n)} \quad \text{Eq. 2}$$

From Eq. 2, it can be seen that as the inlier rate w decreases, the number of iterations k increases exponentially. Thus, the RANSAC iterative method is unsuitable for estimating a homography from an inlier-poor set of candidate correspondences.

The computing system 104 is configured to efficiently compute a homography between the images 110, 112 (e.g., with fewer computing resources than needed for a conventional RANSAC method performing k iterations according to Eq. 2) when the set of candidate correspondences 122 generated by the feature matching component 114 has a low inlier rate (e.g., less than or equal to 10%, less than or equal to 5%, less than or equal to 2.5%). The inlier identification component 118 is configured to identify inliers from among the candidate correspondences 122. The homography computation component 116 is configured to compute candidate homographies for the images 110, 112 based upon the inliers identified by the inlier identification component 118.

In connection with identifying inliers among the candidate correspondences 122, the inlier identification component 118 causes the homography computation component 116 to compute an approximate homography 124 based upon a single correspondence from the candidate correspondences 122. The approximate homography 124 is an estimate of an affine homography between the first image 110 and the second image 112. In general, an affine transformation A can be decomposed as:

$$A = \begin{bmatrix} s_x & 0 & 0 \\ 0 & s_y & 0 \\ 0 & 0 & 1 \end{bmatrix} \begin{bmatrix} \cos\theta & -\sin\theta & 0 \\ \sin\theta & \cos\theta & 0 \\ 0 & 0 & 1 \end{bmatrix} \begin{bmatrix} 1 & sk_x & 0 \\ sk_y & 1 & 0 \\ 0 & 0 & 1 \end{bmatrix} \begin{bmatrix} 1 & 0 & t_x \\ 0 & 1 & t_y \\ 0 & 0 & 1 \end{bmatrix} \quad \text{Eq. 3}$$

where $s_x$ and $s_y$ are scaling factors in the x- and y-directions, $\theta$ is an angle of rotation, $sk_x$ and $sk_y$ are skew factors, and $t_x$ and $t_y$ are translations. An affine homography estimator H' can be defined as:

$$H' = H'_1 H'_2{}^{-1} \quad \text{Eq. 4}$$

where:

$$H'_1 = \begin{bmatrix} s_1 & 0 & 0 \\ 0 & s_1 & 0 \\ 0 & 0 & 1 \end{bmatrix} \begin{bmatrix} \cos\theta_1 & -\sin\theta_1 & 0 \\ \sin\theta_1 & \cos\theta_1 & 0 \\ 0 & 0 & 1 \end{bmatrix} \begin{bmatrix} 1 & 0 & u_1 \\ 0 & 1 & v_1 \\ 0 & 0 & 1 \end{bmatrix} \quad \text{Eq. 5}$$

$$H'_2 = \begin{bmatrix} s_2 & 0 & 0 \\ 0 & s_2 & 0 \\ 0 & 0 & 1 \end{bmatrix} \begin{bmatrix} \cos\theta_2 & -\sin\theta_2 & 0 \\ \sin\theta_2 & \cos\theta_2 & 0 \\ 0 & 0 & 1 \end{bmatrix} \begin{bmatrix} 1 & 0 & u_2 \\ 0 & 1 & v_2 \\ 0 & 0 & 1 \end{bmatrix} \quad \text{Eq. 6}$$

where $s_1$ and $s_2$ are scale factors of the first point and second point of a candidate correspondence, respectively, and $\theta_1$, $\theta_2$ are orientation angles associated with the first and second point. In Eqs. 5 and 6, it is assumed for simplicity that skew factors are equal to zero. The homography computation component 116 can compute the approximate homography 124 as H' according to Eqs. 4-6, based upon pixel locations, scale factors, and orientation angles of a pair of points in a single candidate correspondence drawn from the candidate correspondences 122. The single candidate correspondence can be selected randomly from among the candidate correspondences 122. In various embodiments, the feature matching component 114 identifies scale factors and orientation angles of points in correspondences and stores these values with their corresponding points in the candidate correspondences 122. For example, SIFT and SURF algorithms can be configured to compute scale factors and orientation angles of the correspondences that they identify.

While the homography computation component 116 has been described above as computing only a single approximate homography 124, it is to be understood that the homography computation component 116 can compute multiple approximate homographies in connection with determining the approximate homography 124 to be used in subsequent computations. By way of example, and not limitation, the homography computation component 116 can be configured to randomly select a plurality of correspondences from the candidate correspondences 122, and to compute a different approximate homography for each of the randomly selected correspondences. The homography computation component 116 can then select a best-supported approximate homography among the computed approximate homographies, and the best-supported approximate homography used as the approximate homography 124. A number of the plurality of correspondences that are randomly selected to generate approximate homographies can be the number k computed according to Eq. 2, assuming initially that w is equal to 1/m, where m is taken as the number of candidate correspondences in the candidate correspondences 122. This number k can be iteratively updated after the computation of each approximate homography, wherein for each new iteration, the inlier rate w used to compute k is taken as the support of the best-supported of the approximate homographies divided by the total number of candidate correspondences 122.

The inlier identification component 118 can use the approximate homography 124 computed by the homography computation component 116 to identify likely inliers in the candidate correspondences 122. The inlier identification component 118 can be configured to compute, for each of the candidate correspondences 122, a reprojection error based upon the approximate homography 124. The reprojection error can be defined as an error between a) a location identified by a projection of a first point in a correspondence into a second image based upon the first point and the approximate homography 124 and b) the location of the second point in the correspondence. Stated differently, the reprojection error indicates a difference between where a correspondence identifies a first point in a first image being located in a second image, and the location in the second image to which the homography projects the first point.

Based upon the computed reprojection errors of each of the candidate correspondences 122, the inlier identification component 118 can label correspondences in the candidate correspondences 122 as being inlier candidates 126. Correspondences in the candidate correspondences 122 that have low reprojection errors with respect to the approximate homography 124 are considered to be likely inliers. In an exemplary embodiment, the inlier identification component 118 identifies the inlier candidates 126 as those correspondences that have reprojection errors lower than an inlier threshold reprojection error $\varepsilon_R$. In various embodiments, the inlier threshold reprojection error can be based upon a mean or median reprojection error of the correspondences 122. In other embodiments, the inlier threshold reprojection error can be an estimate of an upper bound for the reprojection error of outliers, $Q_3 + 3R$ where $Q_3$ is a $75^{th}$ percentile reprojection error and R is the interquartile range for reprojection errors of the candidate correspondences 122. In still other embodiments, the inlier identification component 118 can identify inlier candidates 126 as some fraction of the candidate correspondences 122 having the lowest reprojection errors (e.g., the lowest half, the lowest third, or the lowest fourth).

The inlier candidates 126 identified by the inlier identification component 118 will not necessarily have a 100% inlier rate. However, the inlier rate $w_f$ of the inlier candidates 126 should be higher than the inlier rate of the larger set of candidate correspondences 122. The homography computation component 116 can then iteratively compute candidate homographies 128 to identify a final homography 130 that is sufficiently accurate to use for image registration between the images 110, 112.

The homography computation component 116 computes the candidate homographies 128 using any of various robust estimator methods. In an exemplary embodiment, the homography computation component 116 can compute the candidate homographies 128 using a 4-correspondence RANSAC method, as described above with respect to Eq. 1. In various other embodiments, the homography computation component 116 can compute the candidate homographies 128 using an algorithm from other robust estimator algorithm families such as, but not limited to, NAPSAC, PROSAC, GC-RANSAC, MAGSAC++, or P-NAPSAC. Regardless of which estimator algorithm is employed, the homography computation component 116 computes a candidate homography by drawing sample points from the inlier candidates 126. A support of the candidate homography can be computed based upon the larger set of candidate correspondences 122. Thus, the homography computation component 116 draws samples from the inlier candidates 126 to increase the likelihood of using inliers to compute a candidate homography, but computes the support of the candidate homography against the whole correspondence dataset to avoid overmatching the final homography 130 to the set of inlier candidates 126, which may not be perfectly representative of all true inliers in the set of candidate correspondences 122. In other embodiments, however, the homography computation component 116 can compute the support of a candidate homography against the inlier candidates 126.

The homography computation component 116 computes the support of a candidate homography based upon reprojection errors of the candidate homography with respect to the candidate correspondences 122 (or inlier candidates 126). By way of example, the homography computation component 116 can compute the support of a candidate homography as a number of the candidate correspondences 122 for which the reprojection error of the candidate homography is below a pre-defined support reprojection error threshold $\varepsilon$.

A number of the candidate homographies 128 generated by the homography computation component 116 can be the value k computed according to Eq. 2, taking the inlier rate w as initially equal to 1/m, where m is the number of candidate correspondences in the candidate correspondences 122. In other embodiments, the inlier rate w can be taken as initially equal to a computed support of the approximate homography 124 with respect to the candidate correspondences 122 divided by the total number of the candidate correspondences 122. A value of the probability parameter p can be selected based upon desired performance with respect to a given application. During runtime, the homography computation component 116 can update the number of iterations k by substituting the support of the best-supported candidate homography that has been computed up to that point in time, divided by the total number of the correspondences 122, for the inlier rate w in Eq. 2. In other embodiments, a number of candidate homographies 128 generated by the homography computation component 116 can be based upon a threshold level of support, such that once the threshold level of support is reached by one of the candidate homographies 128, the homography computation component 116 completes computation of the candidate homographies 128. In still further embodiments, a number of candidate homographies computed by the homography computation component 116 can be based upon a computing resources budget. For example, the homography computation component 116 can compute candidate homographies until a predefined amount of time has elapsed, or until a predefined number of processing cycles has been completed, etc.

The homography computation component 116 can select the final homography 130 to be used for image registration by the image registration component 120 based upon the computed support of each of the candidate homographies 128. In an exemplary embodiment, the homography computation component 116 selects the candidate homography that has the greatest support among the candidate homographies 128 as the final homography 130.

While the candidate homographies 128 are described as including multiple candidate homographies, it is to be understood that the homography computation component 116 need not retain every computed homography in the memory 108. For instance, the homography computation component 116 can be configured such that only the candidate homography with the greatest support among the candidate correspondences 122 is stored in the memory 108 at a given time.

Once the final homography 130 has been identified by the homography computation component 116, the image registration component 120 can register the images 110, 112 to a common coordinate system based upon the final homography 130. The images 110, 112 thusly registered can be used for any of various purposes. For example, the computing system 104 can identify overlapping portions of the images 110, 112 in order to stitch the images 110, 112 together into a larger image. In other embodiments, the computing system 104 can be configured to generate a three-dimensional model of an object depicted in the images 110, 112 based upon the final homography 130.

FIG. 4 illustrates an exemplary methodology relating to image registration and homography computation. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 4, a methodology 400 that facilitates registering and computing a homography between two images based upon an inlier-poor correspondence set is illustrated. The methodology 400 begins at 402, and at 404, a set of candidate correspondences between two images is received. Each of the candidate correspondences can include a first point in the first image and a second point in the second image that is likely to be representative of a same portion of a same object as the first point in the first image. Each of the candidate correspondences can further include affine parameters such as scale and orientation of each associated with each of the first and second points.

At 406, an approximate homography between the first image and the second image is computed based upon a correspondence drawn from the set of candidate correspondences received at 404. In exemplary embodiments, the approximate homography can be computed based upon only a single correspondence sample, taking into further consideration the scale and orientation parameters associated with the points of the correspondence, as described above with respect to Eqs. 4-6. At 408, inlier correspondences can be identified in the set of candidate correspondences based upon the approximate homography. By way of example, a correspondence in the set of candidate correspondences can be identified as being a likely inlier correspondence based upon a reprojection error of the approximate homography being low with respect to the correspondence relative to the reprojection error with respect to other correspondences in the candidate correspondences.

At 410, a final homography between the first image and the second image can be computed based upon a plurality of points that are selected (e.g., at random) from the inlier correspondences identified at 408. In an exemplary embodiment, a plurality of candidate homographies are computed based upon a four-correspondence RANSAC algorithm that draws samples from the set of inlier correspondences. The candidate homography that has the greatest support among the set of candidate correspondences received at 404 can then be selected as the final homography. When the final homography has been computed 410, the final homography can be used to perform image registration between the two images 412, whereupon the methodology 400 ends 414.

Figure 5:
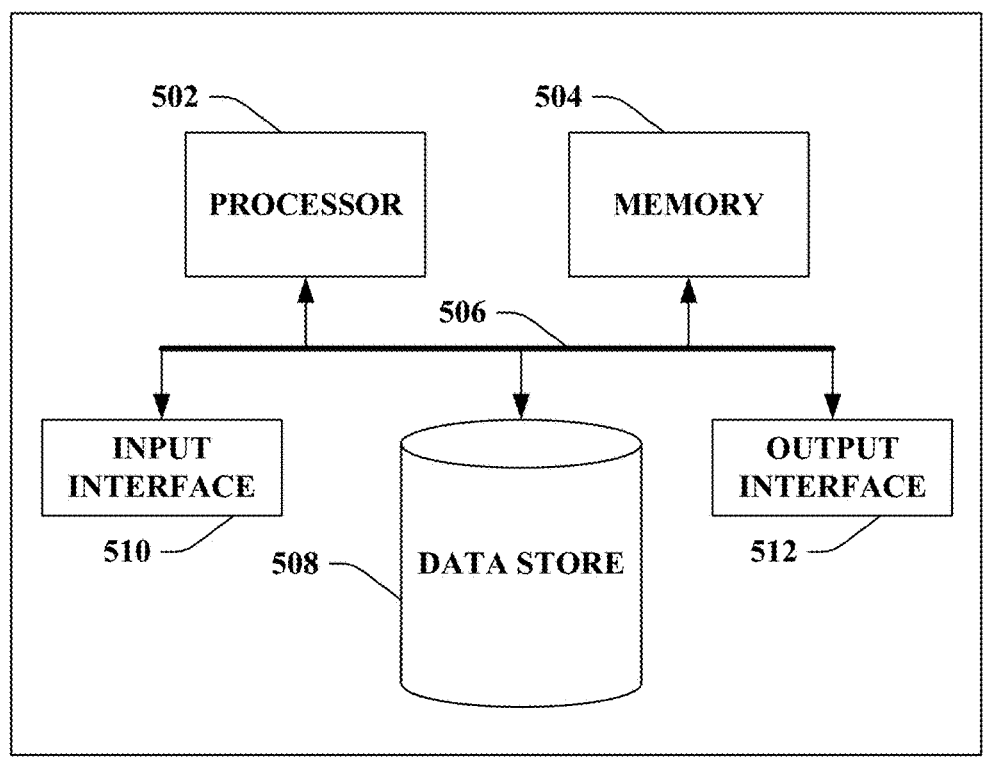
FIG. 5 is an exemplary computing system.
Figure 6:
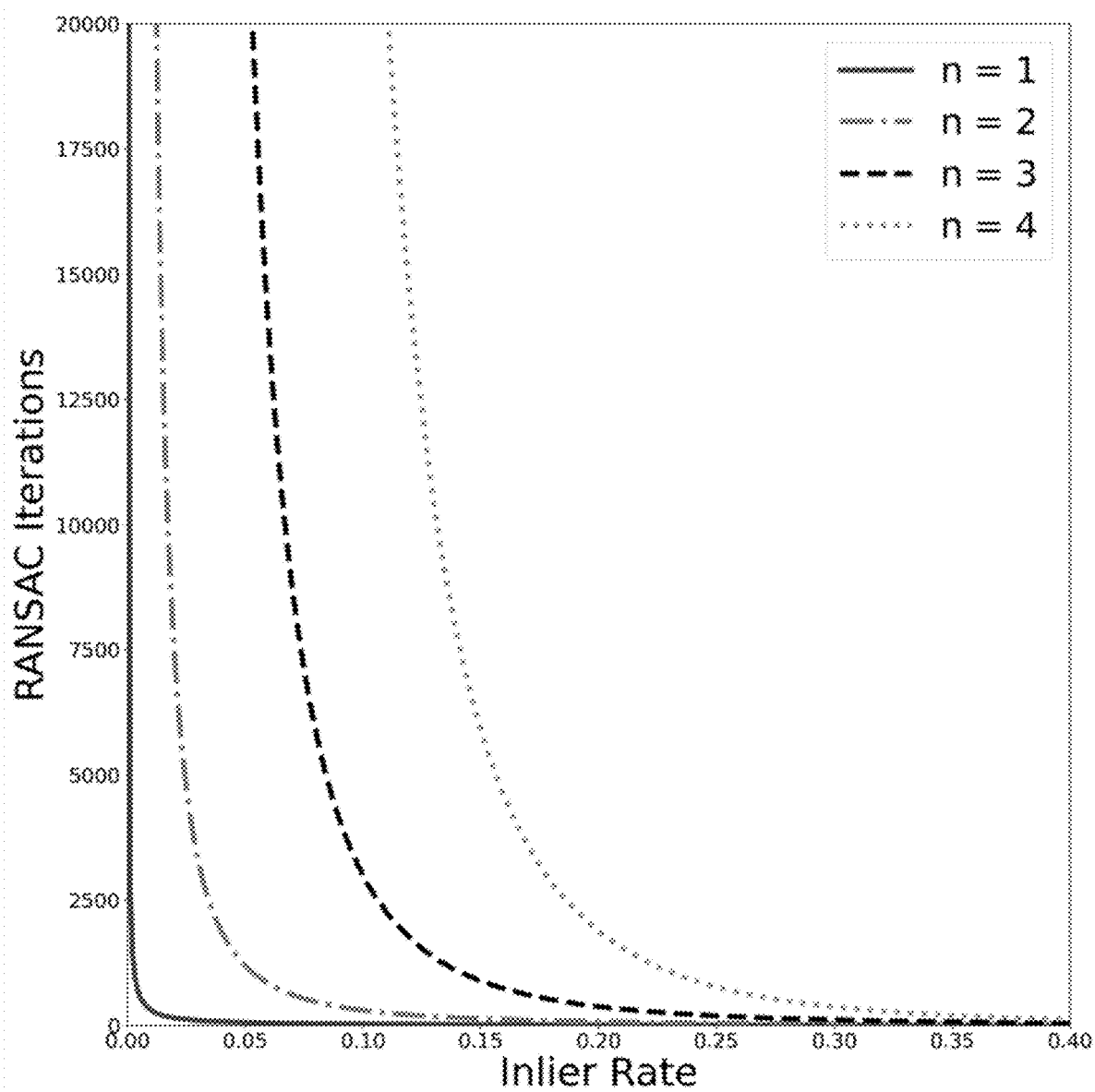
FIG. 6 is a plot of required iterations of a RANSAC algorithm to compute a homography against inlier rate of a correspondence set.

Referring now to FIG. 5, a high-level illustration of an exemplary computing device 500 that can be used in accordance with the systems and methodologies disclosed herein is illustrated. For instance, the computing device 500 may be used in a system that generates or receives images. By way of another example, the computing device 500 can be used in a system that performs image registration and/or computes homographies between images. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store images, correspondences between the images, homographies, etc.

The computing device 500 additionally includes a data store 508 that is accessible by the processor 502 by way of the system bus 506. The data store 508 may include executable instructions, image, homographies, candidate correspondences, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc., by way of the output interface 512.

It is contemplated that the external devices that communicate with the computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 500 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
   a processor; and
   memory that stores instructions that, when executed by the processor, cause the processor to perform the following acts:
   responsive to receiving a set of candidate correspondences between a first image and a second image, selecting a first candidate correspondence from the set;
   computing a homography approximation based upon the first candidate correspondence;
   identifying a plurality of inlier correspondences in the set of candidate correspondences based upon reprojection errors of the candidate correspondences relative to the homography approximation;
   computing a final homography between the first image and the second image by drawing sample correspondences from among the inlier correspondences, the final homography indicative of a transformation between a coordinate system of the first image and a coordinate system of the second image; and
   performing an image registration between the first image and the second image based upon the final homography.

2. The computing system of claim 1, wherein the first image and the second image depict a same object.

3. The computing system of claim 1, wherein computing the homography approximation is based upon only the first candidate correspondence in the set of candidate correspondences.

4. The computing system of claim 1, wherein a second candidate correspondence is identified as being among the inlier correspondences based upon a reprojection error of the second candidate correspondence being below a threshold.

5. The computing system of claim 1, wherein a second candidate correspondence is identified as being among the inlier correspondences based upon a reprojection error of the second candidate correspondence being less than reprojection errors of other candidate correspondences in the set of candidate correspondences with respect to the homography approximation.

6. The computing system of claim 1, the acts further comprising generating the set of candidate correspondences based upon the first image and the second image using a feature matching algorithm.

7. The computing system of claim 6, wherein the feature matching algorithm belongs to a family of scale-invariant feature transform (SIFT) algorithms.

8. The computing system of claim 6, wherein the feature matching algorithm belongs to a family of speeded-up robust features (SURF) algorithms.

9. The computing system of claim 1, wherein computing the final homography comprises:
   computing a candidate homography by drawing samples from among the inlier correspondences;
   computing a support of the candidate homography over the set of candidate correspondences; and
   selecting the candidate homography as the final homography based upon the computed support of the candidate homography.

10. The computing system of claim 9, wherein selecting the candidate homography as the final homography is based upon the computed support of the candidate homography having a greatest support over the candidate correspondences among a plurality of candidate homographies.

11. The computing system of claim 1, wherein the homography approximation is computed based upon orientation and scale parameters of the first candidate correspondence.

12. The computing system of claim 1, wherein computing the final homography comprises:
   selecting a set of four correspondences from among the inlier correspondences; and
   computing the final homography by executing a four-correspondence homography computation algorithm employing the selected set of correspondences.

13. A method, comprising:
   responsive to receiving a set of candidate correspondences between a first image and a second image, computing an approximate homography between the first image and the second image based upon a first correspondence in the candidate correspondences;
   identifying a plurality of inlier correspondences in the set of candidate correspondences based upon reprojection errors of the candidate correspondences relative to the approximate homography;
   computing a final homography between the first image and the second image based upon a plurality of points selected from the inlier correspondences; and
   performing an image registration between the first image and the second image based upon the final homography.

14. The method of claim 13, wherein the final homography is selected for performing the image registration based upon a support of the final homography, the support of the final homography computed based upon the set of candidate correspondences and the final homography.

15. The method of claim 13, wherein the support of the final homography is computed based upon reprojection errors of the set of candidate correspondences with respect to the final homography.

16. The method of claim 13, wherein the first correspondence comprises:
   a first location in the first image;
   a first scale value with respect to the first image;
   a first orientation value of the first image;
   a second location in the second image;
   a second scale value with respect to the second image; and
   a second orientation value of the second image, wherein the approximate homography is computed based upon the first location, the first scale value, the first orientation value, the second location, the second scale value, and the second orientation value.

17. The method of claim 16, wherein the first correspondence is indicative that the first location in the first image and the second location in the second image are likely representative of a same portion of a same object.

18. A computer-readable storage medium comprising instructions that, when executed by a processor, perform the following acts:
   generating a set of candidate correspondences between a first image and a second image, each of the candidate correspondences indicative of a first location in the first image and a second location in the second image being likely to be representative of a same object;
   computing an approximate homography between the first image and the second image based upon a single correspondence in the set of candidate correspondences;
   selecting a plurality of inlier correspondences from the set of candidate correspondences based upon a reprojection error of the inlier correspondences relative to the approximate homography;
   computing a plurality of candidate homographies based upon the inlier correspondences;
   selecting a final homography from among the candidate homographies based upon computing support values of the candidate homographies relative to the set of candidate correspondences; and
   performing an image registration between the first image and the second image based upon the final homography.

19. The computer-readable storage medium of claim 18, wherein the plurality of candidate homographies are computed based upon a random sample consensus (RANSAC) algorithm.

20. The computer-readable storage medium of claim 19, wherein the plurality of candidate homographies are computed based upon drawing samples from the inlier correspondences and computing support of the homographies based upon the set of candidate correspondences.

* * * * *